Feb. 16, 1965 L. D'INCERTI 3,169,708
PHOTOGRAPHIC CAMERA WITH PHOTOFLASH UNIT HINGED THERETO
Filed Oct. 4, 1961

INVENTOR
Ludovico d'Incerti
BY
Watson, Cole, Grindle & Watson
Attys.

United States Patent Office 3,169,708
Patented Feb. 16, 1965

3,169,708
PHOTOGRAPHIC CAMERA WITH PHOTOFLASH
UNIT HINGED THERETO
Ludovico d'Incerti, Milan, Italy, assignor to Società per
Azioni Ferrania, Milan, Italy, a corporation of Italy
Filed Oct. 4, 1961, Ser. No. 142,853
Claims priority, application Italy, June 20, 1961,
3,139/61
4 Claims. (Cl. 240—1.3)

The present invention relates to a photographic apparatus incorporating a flash-light group assembly, and where said group assembly is located in a convenient position in such a manner as to not obstruct the use of the photographic apparatus, and said group assembly can be completely easily handled (operated) even by inexperienced users.

The apparatus according to the invention and incorporating a flash-light assembly, is characterised by the fact that on the frontal part of the apparatus there is a hinged support for the bulb socket and the reflector, comprised of a plurality of hinged fanned out fins being hinged in correspondence with the axis of the bulb socket in such a manner that when the aforesaid mentioned support is lowered, they become spread out fanwise, whilst when the support is turned up against the photographic apparatus, the fins become closed up to each other and adhere to the support.

In the sake of facility, the support is hinged to the lower extremity of the photographic apparatus, and in such a manner that the lamp socket is in vertical alignment with the lens of the apparatus, whilst the support is given a substantially box shape so as to house the folded back fins, and thus confine the space dimensions requirements of the flash-light assembly when said assembly is not in use.

The invention is illustrated for purely purposes of example in the attached drawing and in which.

This photographic apparatus in its upper frontal part is equipped with framework A, which amongst other things houses the lens B, and in its lower section terminates with holed lugs 10. Into the hole of these lugs is fitted a horizontal pin 12 which holds a holed head piece 14 provided with a supporting plate 16 suitably shaped in accordance with the following description.

Figure 4:
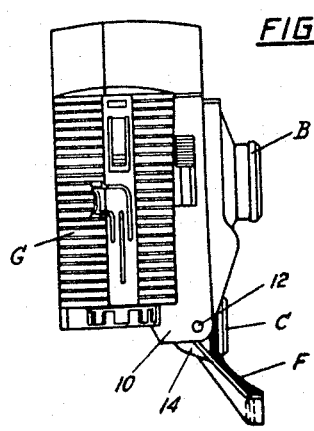
Figure 5:
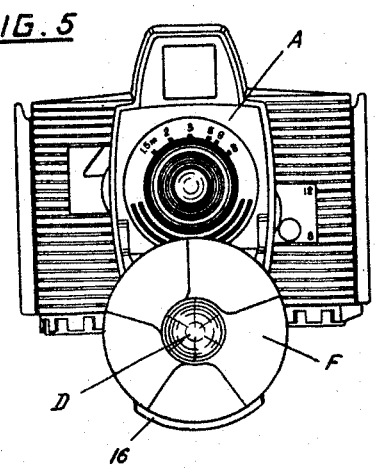
FIGURES 5 and 6 show the apparatus in frontal and side view with the flash-light assembly ready for use.
Figure 6:
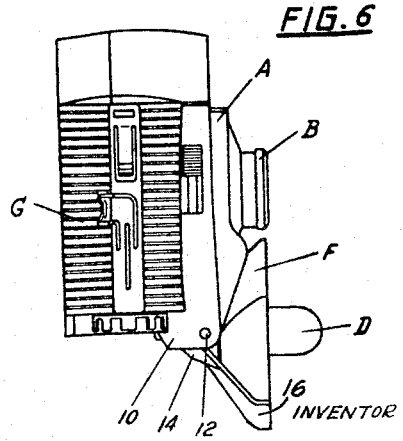

To the holded head piece 14 is fixed the base of a lamp socket C (see FIGS. 3 and 4) of the type suited to accepting a lamp D, which as is clearly shown in FIGS. 5 and 6 is located in an operating position so that its axis is substantially parallel to the axis of the lens B.

The aforesaid mentioned base is suitably shaped so as to constitute a pinion for the retention of a series of fin blades F laid one on top of each other, and biased open out as a fan (see FIGS. 5 and 6) so as to constitute the reflector for lamp D when they are open.

Figure 1:
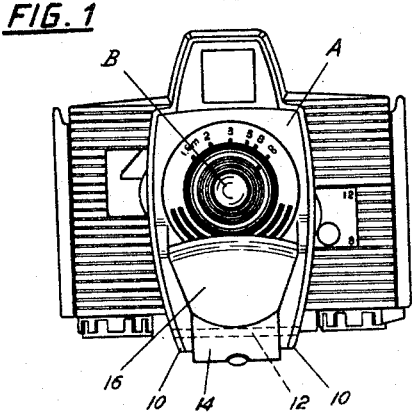
FIGURES 1 and 2 show a frontal side view and side view of the photographic apparatus with the flash-light assembly closed or in turned up position.
Figure 2:
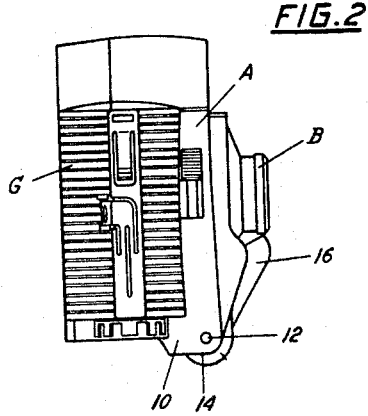
Figure 3:
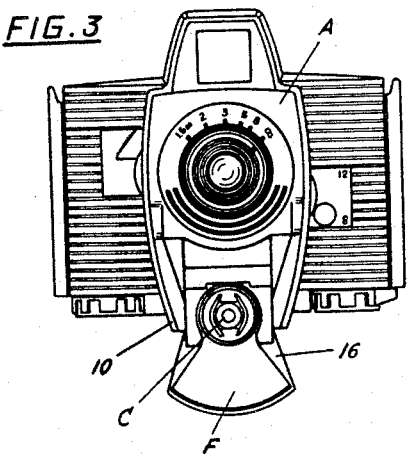
FIGURES 3 and 4 are similar views of the apparatus in the first operational phase of the flash-light assembly with the reflector closed.

As shown in FIGS. 3 and 4, when the fin blades F are closed and lying one on top of the other, they are housed in the supporting plate 16, which is suitably shaped in such a manner that when it is in the turned up position shown in FIGS. 1 and 2, it hides the fins and lamp socket from sight and its curved edge is located below the level of the lens B.

In the lower part of the photographic apparatus the units which complete and feed the flash lamp assembly are arranged in a suitable housing, and such units being the electric source and relative resistance. Said housing is accessible by removing the back cover G of the apparatus.

I claim:

1. A box-like photographic apparatus comprising a camera framework, a lens mounted on the front side of said camera framework, a flashlight unit comprising a lamp holder and a reflector with support means therefor mounted on the framework below and in alignment with said lens, said reflector having a plurality of blades fan-shaped and hinged to said lamp holder and being movable to open spread-out operative position, hinge means on the support means provided on one of the ends thereof and in the front part of the framework, said lamp holder and reflector being movable downwardly about said hinge means to said open spread-out operative position, said lamp holder and reflector being movable upwardly about said hinge means in a folded position and being held against the framework in said folded position and said lamp holder and reflector being of such a size that when it is in said folded position against said framework it is held just under said lens in an unobstructed position for use of the apparatus in natural light.

2. Photographic apparatus according to claim 1, in which the support means is substantially of box shape to house the reflector and the lamp holder.

3. Photographic apparatus according to claim 1, in which a pin is provided to hinge the support means to the framework and which in the central zone of the flashlight unit houses the lamp holder.

4. Photographic apparatus according to claim 1, in which a pin is provided to hinge the support means to the framework and which in the central zone of the flashlight unit houses the lamp holder, and in which lugs are provided on the framework to hold the support means and said lug means being located on the front of the apparatus.

References Cited in the file of this patent
UNITED STATES PATENTS

| | | |
|---|---|---|
| 2,688,071 | Wright | Aug. 31, 1954 |
| 2,780,720 | Bertrams | Feb. 5, 1957 |
| 3,016,453 | Van Der Mei | Jan. 9, 1962 |

FOREIGN PATENTS

| | | |
|---|---|---|
| 840,644 | Great Britain | July 6, 1960 |